United States Patent
Bito

(10) Patent No.: US 6,654,474 B2
(45) Date of Patent: Nov. 25, 2003

(54) ARM-WEAR-TYPE COMMUNICATION DEVICE

(75) Inventor: Yoshinori Bito, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/015,402

(22) Filed: Dec. 12, 2001

(65) Prior Publication Data

US 2002/0094102 A1 Jul. 18, 2002

(51) Int. Cl.[7] .................................. H04R 25/00
(52) U.S. Cl. ........................ 381/364; 381/189
(58) Field of Search ........................ 381/189, 359, 381/358, 360, 364, 355, 357, 372, 373, 346, 347; 379/433.1; 455/89, 90

(56) References Cited

U.S. PATENT DOCUMENTS

| | | | | |
|---|---|---|---|---|
| 2,566,168 A | * | 6/1951 | Cragg et al. |
| 4,146,757 A | * | 3/1979 | Murad |
| 5,263,093 A | * | 11/1993 | Nakamura et al. |
| 5,420,935 A | * | 5/1995 | Shinohara et al. |
| 5,659,611 A | * | 8/1997 | Saksa |
| 6,018,585 A | * | 1/2000 | Akino et al. |
| 6,188,773 B1 | * | 2/2001 | Murata et al. |
| 6,408,072 B1 | * | 6/2002 | Fernandez-Martinez |

* cited by examiner

Primary Examiner—Sinh Tran
(74) Attorney, Agent, or Firm—Adams & Wilks

(57) ABSTRACT

The present invention provides an arm-wear-type communication device for protecting a speaker and the like. In an arm-wear-type communication device, a speaker is equipped on a housing that is a portion fitting to an ear. After this speaker is matched into a cavity of the housing, the speaker is embedded by a housing cover. After the speaker is installed, a sound opening equipped for connecting the inside of the housing with the outside of the housing is equipped by boring as a sound emitting opening on the housing cover. An air chamber formed by the housing cover is equipped immediately in front of a sound emitting portion of the speaker. Further, on the back surface of the housing cover, a waterproof sheet is stuck to protect infiltration of rain, sweat or the like into the speaker. The housing cover engages with a cushion including a sound communication opening equipped at a different position from the position where the sound opening is extended approximately in a vertical direction to the outside with respect to the housing.

8 Claims, 2 Drawing Sheets

ARM-WEAR-TYPE COMMUNICATION DEVICE

BACKGROUND OF THE INVENTION

1. Field of the Invention

The present invention relates to an arm-wear-type communication device provided with a cushion.

2. Description of the Related Art

A conventional communication device is provided with electronic components such as a microphone or a speaker inside its housing. The microphone or the speaker provides a space to be an air chamber for amplifying sound between the microphone and the housing or between the speaker and the housing. Further, the device is provided with a hole as a sound gathering opening or a sound emitting opening at a portion of the housing in order to secure a communication path for sound to the outside of the housing. Also, most of the conventional communication devices not to be worn on an arm do not include a waterproof function except for the case applying to a particular purpose.

In recent years, the communication device has made a significant advance in its miniaturization. Therefore, an arm-wear-type communication device comes to be put into practical use. In contrast to the communication device not to be worn on an arm, the arm-wear-type communication device requires a waterproof construction for preventing infiltration of water such as sweat. Thus, in terms of waterproof property and air permeability, a waterproof sheet has been generally used. In the construction of the device, the waterproof sheet is stuck on the inside of a sound emitting opening portion or the inside of a sound gathering opening portion, to thereby prevent the water infiltration.

Further, in the case of the arm-wear-type communication device, in order to cause the speaker to be near the position of an ear and the microphone near the position of a mouth, it is devised that the speaker and the microphone each are disposed on each of two band portions fitted to a main body.

However, in the case of the arm-wear-type communication device, fingermarks or dust are easily adhered around the sound emitting opening in addition to the sweat or perspiration, resulting in a problem in that the waterproof sheet is easily damaged at the time of clearing the fingermarks or the dust. When the waterproof sheet is damaged, the waterproof property is lost. In the case of the device having a curved band with a small radius of curvature, though a user tries to fit a speaker portion to his/her ear, it is difficult to closely fit the sound emitting opening portion to his/her ear. Therefore, the user can not easily listen to the sound.

SUMMARY OF THE INVENTION

The present invention is devised to solve the above-described problem. An object of the present invention is to provide an arm-wear-type communication device maintaining and improving the waterproof property of the speaker and a listening property for a user.

To achieve the above-described object, the present invention is made to be an arm-wear-type communication device that is a band portion of the arm-wear-type communication device, which is provided with a housing cover having a sound opening for connecting the inside of a housing with the outside of the housing and facing a sound device; and a cushion for disposing an outer shape of a sound communication opening at a position rather outside in a plane than that of the sound opening, and fitted to the housing cover.

The sound devices such as the microphone and the speaker are equipped inside the housing of the band portion of the arm-wear-type communication device. These sound devices are matched into a cavity of the housing, and then embedded by the housing cover. The sound opening equipped for connecting the inside of the housing with the outside of the housing is bored as the sound emitting opening or the sound gathering opening on the housing cover. In this construction, an air path penetrating the sound device and the outside of the housing is secured, and the efficient sound communication becomes possible. It is appropriate that the sound opening is equipped by boring at the position facing the sound device.

When the arm-wear-type communication device is used by taking off from the arm, the cushion is equipped at the band portion facing the face of the user. This cushion includes the sound communication opening at the different position from that the sound opening is extended approximately in a vertical direction to the outside with respect to the housing. This sound communication opening makes it possible to communicate sound. In addition, even if boring is performed with a thin stick from the outer surface of the cushion in order to clear dust or the like from the sound communication opening, the stick does not contact to the sound opening of the housing cover. Since the cushion is engaged with the housing cover, the positional relation is maintained. Further, the cushion also serves as a role for making the device fit to the shape of the ear contacting therewith and preventing the sound from scattering.

The present invention is the arm-wear-type communication device, wherein the housing cover forms the air chamber so as to face the sound emitting portion of the speaker embedded in the housing and the waterproof sheet is stuck to the back surface of the housing cover.

In the-arm-wear-type communication device, the speaker for listening to sound by the user is embedded into the housing. The air chamber formed by the housing cover is provided immediately in front of the sound emitting portion of the speaker. This air chamber is airtight and the air fluctuation required in communicating sound is secured. The waterproof sheet is stuck on the back surface of the housing cover to prevent the infiltration of rain, sweat or the like into the speaker. The waterproof sheet may be stuck only on a connection portion between the air chamber and the sound opening, or on an inner wall of the air chamber including the connection portion.

The present invention is the arm-wear-type communication device, wherein the microphone is used as the sound device and the waterproof sheet is stuck on the portion that is the back side of the sound opening of the housing cover and faces the microphone.

The present invention is the arm-wear-type communication device, wherein the cushion fitted to the housing cover is projected into the outside of a string connecting a hinge of the curved band portion with the speaker tip, and includes the sound communication opening at the projected position.

The microphone is also equipped on the band portion of the arm-wear-type communication device. The waterproof sheet is stuck on the portion that is the back side of the sound opening of the housing cover faces the microphone. This waterproof sheet prevents the infiltration of sweat and water into the microphone embedded into the housing. On the cushion engaged with the housing cover, the sound communication opening is equipped by boring at the different position from that the sound opening is extended approximately in a vertical direction to the outside with respect to the housing. This sound communication opening makes it possible to communicate sound. In addition, even if boring is performed with a thin stick from the outer surface of the cushion in order to clear dust or the like from the sound communication opening, a moisture permeation/waterproof sheet and the microphone are not damaged. Further, even if the curved band fitted to the arm is employed, the user can communicate by the device without leaking the speaker sound to the outside.

DESCRIPTION OF THE PREFERRED EMBODIMENTS

The present invention will be described in detail below with reference to the drawings. Note that, the present invention is not limited to the present embodiment.

Figure 1:
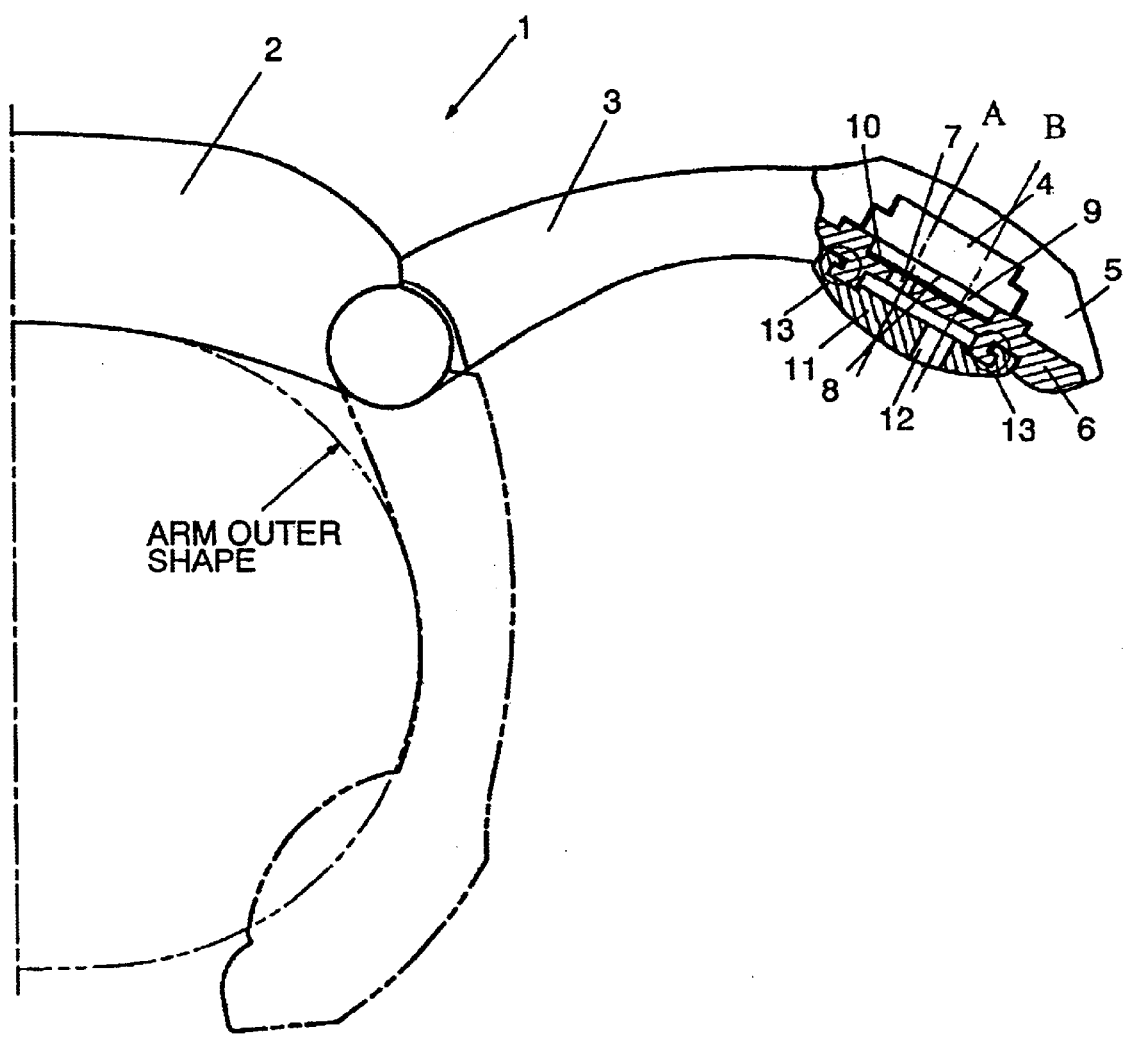
FIG. 1 is a side sectional view showing a cushion construction of the arm-wear-type communication device in accordance with an embodiment of the present invention.

FIG. 1 is a side sectional view showing a cushion construction of an arm-wear-type communication device relating to an embodiment of the present invention. An arm-wear-type communication device 1 is composed of a main body 2 and a band 3. Here the band 3 of one side equipped with a speaker 4 will be described for convenience. There is only such a difference between the band 3 of one side and a band of the other side in that one of the other side equipped with a microphone has no air chamber which will be described below. Therefore, the description of the other side of the band 3 equipped with the microphone is omitted.

In the arm-wear-type communication device 1, communication is performed by fitting the portion of the band 3 to an ear. The speaker 4 is contained within a housing 5 that is a portion fitting to the ear. After the speaker 4 is mounted into a cavity of the housing 5, the speaker 4 is embedded by a housing cover 6. After the speaker 4 is installed, a sound opening 7 for connecting the inside of the housing 5 with the outside of the housing 5 is formed by boring as a sound emitting opening on the housing cover 6. This sound opening 7 secures an air path penetrating the speaker 4 and the outside of the housing cover 6, and makes it possible to communicate sound efficiently. It is appropriate that the sound opening 7 is equipped by boring at the position facing a sound device.

An air chamber 9 formed by the housing cover 6 is provided immediately in front of a sound emitting portion 8 of the speaker 4. This air chamber 9 is airtight and the air fluctuation required in communicating sound is secured. Also, a waterproof sheet 10 is stuck on the back surface of the housing cover 6 to prevent the infiltration of rain, sweat or the like into the speaker 4. The waterproof sheet 10 may be stuck only on a connection portion of the air chamber 9 and the sound opening 7, or on the inner wall of the air chamber 9 including the connection portion as shown in the drawing. Note that, it is preferred that a moisture permeation/waterproof sheet maintaining a waterproof function and allowing a moisture to permeate is applied to the waterproof sheet 10.

The band 3 facing the face of the user is equipped with a cushion 11. This cushion 11 includes a sound communication opening 12 at a different position from the position where the sound opening 7 is extended approximately in a vertical direction to the outside with respect to the housing 5. Here, the position extended approximately in a vertical direction to the outside with respect to the housing 5 indicates such a position that a center axis of the sound opening 7, being extended approximately in a vertical direction to the outside with respect to the housing 5, contacts with the cushion 11. The description of approximately vertical is used because "the position extended approximately in a vertical direction to the outside with respect to the housing" described here includes the case where the sound opening 7 overlaps with the sound communication opening 12 even if the axis is somewhat out of the vertical line from a mathematical viewpoint. Here, the housing 5 includes the housing cover 6. It is preferable that the cushion 11 is composed of a soft material such as silicone rubber or urethane resin.

The sound communication opening 12 makes it possible to transmit the sound emitted from the speaker 4. The sound opening 7 and the sound communication opening 12 are not arranged in a straight line but rather are laterally offset from one another. As shown in FIG. 1, the sound opening 7 extends axially along an axis A and the sound communication opening 12 extends axially along an axis B. The two axes A and B are laterally spaced from one another so that the sound communication opening 12 is laterally spaced from or offset from the sound opening 7. Therefore, the housing cover 6 may be devised to enlarge a sound path by forming a groove on the path connecting the sound opening 7 with the sound communication opening 12. When the cushion 11 is configured in this manner, even if boring is performed with a thin stick from the outer surface of the cushion 11 in order to clear dust or the like from the sound communication opening 12, the stick does not contact with the sound opening 7 of the housing cover 6. If the stick does not contact with the sound opening 7, the stick does not contact with the Waterproof sheet 10 stuck on the back thereof either.

Since the cushion 11 has an engagement 13 engaged with the housing cover 6, the positional relation is maintained. The cushion 11 may be engaged by hanging it on a hook portion of the housing cover 6 as shown in the drawing, or formed to be intruded into the hole or the projection of the housing cover 6. Further, the housing cover 6 may be engaged so that a portion thereof is hung on an engagement portion equipped on another portion of the housing cover 6 and the other portion wraps the housing cover 6 and the housing 5 to cover them. In this construction, when the cushion 11 is removable due to the engagement configuration, in the case where the cushion is dirty, only the cushion is removed to be washed in water, thereby clearing fingermarks or dust therefrom. Therefore, this is convenient.

Figure 2:
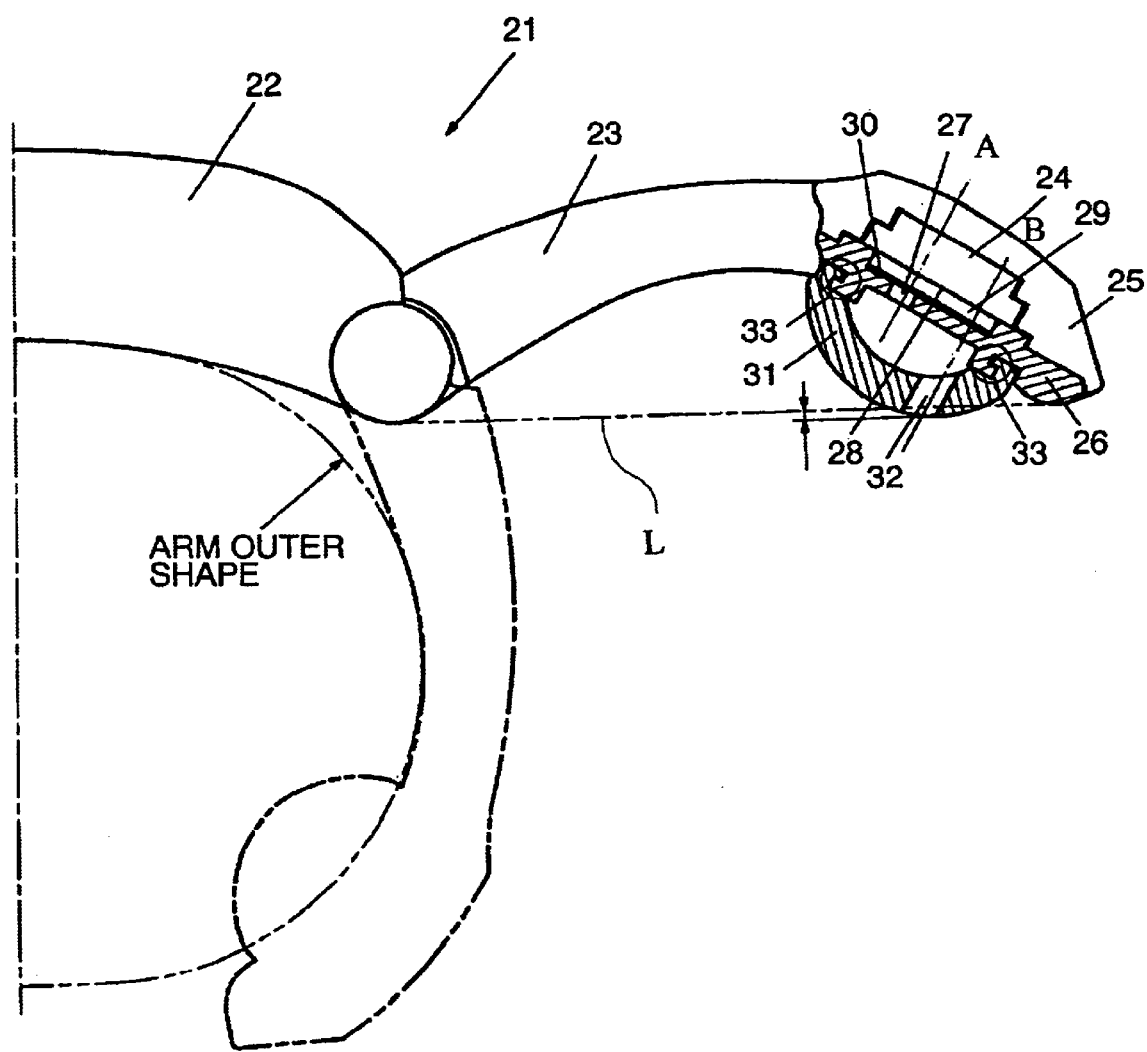
FIG. 2 is a side sectional view showing the cushion construction of the arm-wear-type communication device in accordance with another embodiment of the present invention.

FIG. 2 is a side sectional view of another embodiment showing the construction of the cushion attached to the housing cover, wherein the cushion projects near an imaginary line L connecting the tip of the hinge of the curved band portion with the tip of the speaker, and includes the sound communication opening at the projected position.

FIG. 2 is a side sectional view of another embodiment showing the construction of the cushion attached to the housing cover, wherein the cushion projects near an imaginary line L connecting the tip of the hinge of the curved band portion with the tip of the speaker, and includes the sound communication opening at the projected position.

As described above, according to the cushion of the arm-wear-type communication device according to the present invention, the sound opening 7 included in the housing cover 6 of the band and the sound communication opening 12 of the cushion 11 are not arranged in a straight line. Therefore, when fingermarks or dust or the like adhered around the sound communication opening 12 are cleared, the microphone, the speaker 4 and the waterproof sheet 10 are not accidentally damaged. Further, in the case of the device having the curved band 3 formed of plastics or the like, though the user make the curved band 3 fit to his/her ear, it is difficult to make the curved band 3 fit to a shape of his/her face. Therefore, since the sound opening portion is not closely fitted to the ear, the user cannot easily listen to sound and the concealment property is not easily secured either. According to the present invention, the arrangement of the cushion 11 on the arm-wear-type communication device improves closeness with an ear and is capable of preventing sound from scattering. Therefore, the user can easily listen to the sound. Further, when the arm-wear-type communication device is worn on an arm, since the cushion is appropriately crushed, the space between the arm and the device is filled by the crush, and the holding property is improved. Therefore, the portability of the communication device is also improved.

As described above, according to the arm-wear-type communication device in accordance with the present invention, the sound opening included in the housing cover of the band and the sound communication opening of the cushion are not arranged in a straight line. Therefore, when fingermarks or dust or the like adhered around the sound communication opening are cleared, the built-in sound device is not accidentally damaged.

Further, according to the arm-wear-type communication device in accordance with the present invention, the air chamber is formed so as to face the sound emitting portion of the speaker embedded in the housing and the waterproof sheet is stuck on the back surface thereof. Therefore, sound given from the speaker is easily amplified, and the waterproof property is also maintained. The sound opening included in the housing cover of the band and the sound communication opening of the cushion are not arranged in a straight line. Therefore, when fingermarks or dust or the like adhered around the sound communication opening are cleared, the moisture permeation/waterproof sheet and the built-in sound device are not accidentally damaged.

Further, according to the arm-wear-type communication device in accordance with the present invention, since the waterproof sheet is stuck on the portion that is the back side of the sound opening of the housing cover and faces the microphone, the waterproof sheet prevents the infiltration of sweat or water into the microphone embedded into the housing. On the cushion engaged with the housing cover, the sound communication opening is equipped by boring at the different position from the position where the sound opening is extended approximately in a vertical direction to the outside with respect to the housing. This sound communication opening makes it possible to communicate sound. Even if boring is performed with a thin stick from the outer surface of the cushion in order to clear dust or the like from the sound communication opening, the waterproof sheet and the microphone are not damaged.

Further, in the case of the device having the curved band formed of plastics or the like, though the user make the curved band fit to his/her ear, it is difficult to make the curved band fit to a shape of the face. Therefore, since the sound opening portion is not closely fitted to the ear, the user can not easily listen to sound. However, according to the arm-wear-type communication device in accordance with the present invention, since the cushion is equipped, the closeness of the band with the ear is improved, and the user can easily listen to sound, and further the concealment property is also improved.

What is claimed is:

1. An arm-wear-type communication device comprising:
   a housing containing a sound device therein;
   a housing cover connected to the housing and having a sound opening facing the sound device for connecting an inside and an outside of the housing; and
   a cushion fitted to the housing cover, the cushion having a sound communication opening disposed at a position offset from that of the sound opening so that the two openings are not axially aligned with one another, the cushion projecting beyond an imaginary line connecting a tip of a hinge of a curved band portion of the device with a tip of a housing cover, and the sound communication opening being included at the projected position of the cushion.

2. An arm-wear-type communication device according to claim 1, wherein the housing cover forms an air chamber which faces a sound emitting portion of the sound device embedded in the housing and has a waterproof sheet adhered on a back surface thereof.

3. An arm-wear-type communication device according to claim 1, wherein the sound device is a microphone, and a waterproof sheet is adhered on a portion which is a back side of the sound opening of the housing cover and faces the microphone.

4. In an arm-wearable communication device: a housing containing therein a sound device; a housing cover connected to the housing and having a sound opening extending axially along a first axis and having one end facing the sound device; a waterproof sheet adhered to a back surface of the housing cover that faces the housing, the waterproof sheet extending over and covering the one end of the sound opening facing the sound device; and a cushion connected to the housing cover and having a sound communication opening extending axially along a second axis, the sound communication opening having one end open to the exterior of the device and another end in communication with the sound opening to enable sound to be communicated between the sound device and and the exterior of the device; the second axis being laterally spaced from the first axis so that the sound communication opening is laterally offset from the sound opening; and the two openings being laterally spaced a sufficient distance to prevent a straight object which is inserted from the exterior of the device into the sound communication opening from being inserted into the sound opening thereby protecting the waterproof sheet from damage.

5. An arm-wearable communication device according to claim 4; wherein the first and second axes are parallel to one another.

6. An arm-wearable communication device according to claim 4; wherein the device includes an arm-wearable band having a curved band portion connected by a hinge to the band; and wherein a portion of the cushion projects beyond an imaginary line connecting a tip of the hinge with a tip of the housing cover, the sound communication opening being formed in the projected portion of the cushion.

7. An arm-wearable communication device according to claim 4; wherein the sound device is a speaker.

8. An arm-wearable communication device according to claim 4; wherein the sound device is a microphone.

* * * * *